Figure 1:
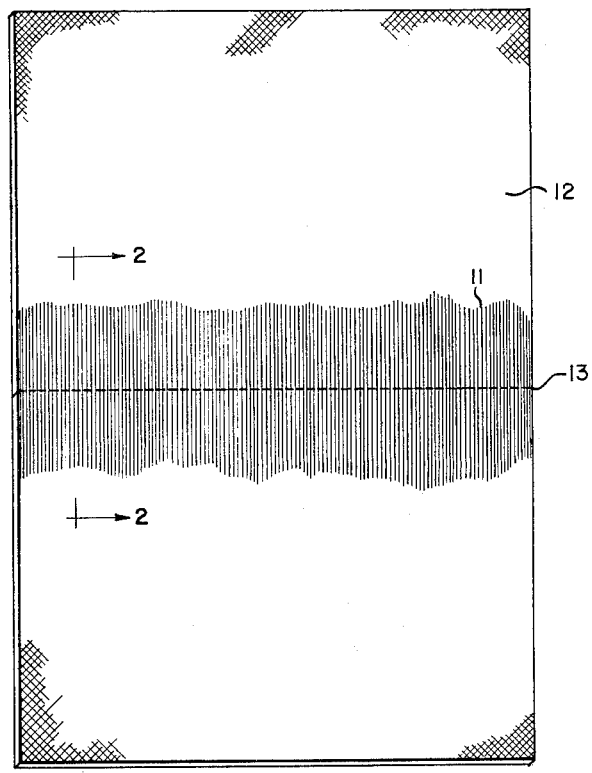

June 30, 1964  C. A. BAKER  3,139,052
MOUNTING SAMPLES OF LOOSE FIBER FOR ARRAY
PREPARATION AND MEASUREMENT
Filed July 17, 1962

INVENTOR
CAMERON A. BAKER

BY

ATTORNEYS

United States Patent Office 3,139,052
Patented June 30, 1964

3,139,052
MOUNTING SAMPLES OF LOOSE FIBER FOR ARRAY PREPARATION AND MEASUREMENT
Cameron A. Baker, Ridgewood, N.J., assignor to the United States of America as represented by the Secretary of Agriculture
Filed July 17, 1962, Ser. No. 210,601
4 Claims. (Cl. 112—410)

This invention relates to a method for securely attaching loose staple fiber samples on a sample backing support in such a manner that the fiber sample can be arrayed for the making of certain measurements that relate to fiber length.

It is important in the mechanical processing of staple fibers and it is particularly important in the research investigations directed toward the mechanical processing of staple fibers to obtain measurements such as minimum fiber length, coefficient of length variation, weight distribution of varying fiber lengths and the like. The Suter-Webb Array method is one such method for determining length distribution and the mean and upper quartile lengths. The Uster Staple Fiber Diagram Tester is another such method. Fiber length measuring methods generally have in common the principle of directionally orienting the fibers of the sample. Some methods place one end of each fiber on a common baseline. Others merely require directional orientation of the fibers in the sample.

One method of length measurement in which only orienting is required is the "clamp" fibrogram. This fibrogram, by means of a curve, indicates the length distribution of fibers on one side of a nip placed on a sliver of fibers, all fibers not held in the nip clamped array having been removed by combing. The fibers in such a method, while oriented, are collected and held at random. It is to methods of measurement such as the latter, which methods are carried out in the cotton industry on raw cotton or on cotton at any particular intermediate stage of processing, that this invention is directed.

Typically, individual staple fiber samples are collected by prescribed methods and prepared by other prescribed methods to obtain array data. It is to the mounting of such loose staple fiber samples for subsequent array preparation that this invention is directed. The secure mounting of the loose staple fiber sample onto a suitable sample backing support is critical for the success of subsequent staple fiber array preparation and the measurements that involve the array. It is desirable that the mounting method be rapid and easy to accomplish, but it is imperative that the fiber sample mounting be secure so that subsequent manipulative operations on the mounted sample such as combing will not disturb the original positions of the fibers in the samples as mounted.

The objective of this invention which is the positive and secure attachment of a sample of staple fibers onto a backing for the purpose of subsequent fiber array preparation and fiber length measurements is attained by stitching the sample onto a flat sample backing support. The requisite surface properties of the backing support are such that motion of the individual staple fibers in any direction relative one to another at the point of attachment to the backing is prevented.

A durable backing support that exhibits a regularly rugulose surface and particularly a backing support in which the individual rugose unconformities with respect to the main plane of the backing and with respect to adjacent unconformities are of the same order of magnitude as the cross-sectional dimensions of the fibers to be anchored thereto is a prime requisite for accomplishing the purposes of this invention.

As will be recognized by those skilled in the art of preparing fiber arrays, the fiber sample backing support material must meet several rigorous requirements. The backing support material must, for example, be sufficiently flexible so that it can be bent and folded back upon itself during combining operations. The backing support material must also be sufficiently tough so that it can endure tight, closely spaced machine stitching without exhibiting any tendency to tear along the line of stitches.

A finely embossed vinyl type plastic is a particularly desirable material to use for the backing support. Vinyl plastic sheet of approximately .006" thickness was employed with good success in the specific example that is described later. As stated, the material that constitutes the backing support must be a material capable of being sewed and must be sufficiently durable to survive extremely close machine stitching of the order of 40 stitches to the inch without exhibiting tear tendencies along the line of stitches. The vinyl plastic material above described satisfactorily meets this requirement.

High tension cotton sewing thread, No. 00, was used to sew a single row of lock stitches, 38/42 stitches per inch in the preferred method of attaching the loose staple fiber sample to the plastic backing material.

A 6" x 8" piece of clear 6 gauge embossed vinyl plastic with a line drawn across the width midway between the ends was selected as the sample backing support.

A length of roving, or sliver, weighing 1.25 grams was divided into approximate 3-inch lengths by gently pulling it apart. These 3-inch lengths were arranged evenly side by side on the plastic across the width and laying on the previously drawn line. A piece of plain bond paper, also marked with a line, was placed across the 3-inch length of fiber superimposing the marked lines on paper and plastic. The paper was held in place by a paper clip at each corner.

A lock stitch sewing machine was adjusted for the smallest stitch and the tightest tension using #00 size cotton thread and 38/42 stitches per inch and a single straight seam was sewed across the cotton fiber, the paper over the cotton and the plastic underneath. The sewn sample was then placed in a clamp with the edge of the clamp jaw exactly lined up with the seam and the clamp tightened. The paper, up to the seam, was then removed and the backed sample was ready for the combing operations.

A time study of this technique showed that about 30 seconds were required for arranging the fibers on a base line, 5 seconds for the actual stitching and about 40 seconds for combing one side. Thus, a total time of about 1¼ minutes is required.

Figure 2:
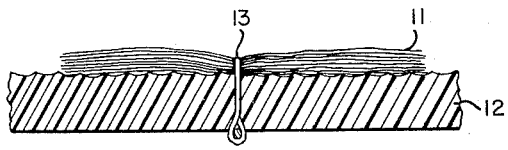
Figure 3:
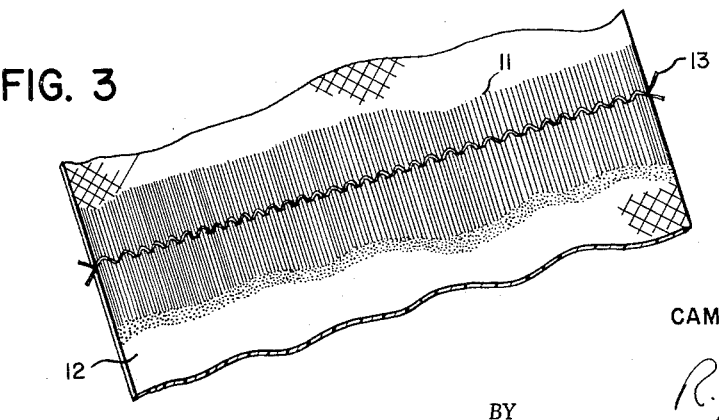

The device for making fiber sample manipulations requisite for fiber array and for subsequent fiber array measurement, resulting from the afore-described procedure, is illustrated in the annexed drawing wherein:

FIG. 1 is a plan view of the device;
FIG. 2 is a cross section on the line 2—2 of FIG. 1; and
FIG. 3 is an enlarged portion of FIG. 1 illustrating the stitching in greater detail.

In the drawing, the sample fibers 11 are depicted as being sewn to the vinyl type plastic 12 as the backing support by means of the sewing thread 13.

I claim:
1. A device for making fiber sample manipulations requisite for fiber array and for subsequent fiber array measurement, comprising a sample of individual loose staple fibers sewn on a flat surface of a backing support with a single straight line of tight, closely-spaced stitches of at least about 40 stitches to the inch, said flat surface of the backing support being regularly rugulose and hav- ing the individual rugose unconformities with respect to the main plane of the backing support and with respect to the adjacent unconformities of the same order of magnitude as the cross-sectional dimensions of said loose staple fibers anchored thereto which surface characteristics render said individual loose staple fibers incapable of motion in any direction relative to one another at the point of attachment to the backing support, said backing support being composed of a material that is sufficiently flexible so that it can be bent and folded back on itself during subsequent combing operations and being sufficiently tough to endure said stitching without exhibiting any tendency to tear along the line of stitches.

2. A device for making fiber sample manipulations requisite for fiber array and for subsequent fiber array measurement, comprising a sample of individual loose staple fibers sewn on a flat surface of a backing support with a single straight line of lock stitches of #00 size cotton thread and of at least about 40 stitches to the inch, said flat surface of the backing support being regularly rugulose and having the individual rugose unconformities with respect to the main plane of the backing support and with respect to the adjacent unconformities of the same order of magnitude as the cross-sectional dimensions of said loose staple fibers anchored thereto which surface characteristics render said individual loose staple fibers incapable of motion in any direction relative to one another at the point of attachment to the backing support, said backing support being composed of a material that is sufficiently flexible so that it can be bent and folded back on itself during subsequent combing operations and being sufficiently tough to endure said stitching without exhibiting any tendency to tear along the line of stitches.

3. A device for making fiber sample manipulation requisite for fiber array and for subsequent fiber array measurement, comprising a sample of individual loose staple fibers sewn on an embossed surface of a vinyl type plastic sheet of approximately .006 inch in thickness with a single straight line of tight, closely-spaced stitches of at least about 40 stitches to the inch, said embossed surface being regularly rugulose and having the individual rugulose unconformities with respect to the main plane of said vinyl sheet and with respect to the adjacent unconformities of the same order of magnitude as the cross-sectional dimensions of said loose staple fibers anchored thereto which surface characteristics render said individual loose staple fibers incapable of motion in any direction relative to one another at the point of attachment to the vinyl sheet, said vinyl sheet being sufficiently flexible so that it can be bent and folded back on itself during subsequent combing operations and being sufficiently tough to endure said stitching without exhibiting any tendency to tear along the line of stitches.

4. A device for making fiber sample manipulations requisite for fiber array and for subsequent fiber array measurement, comprising a sample of individual loose staple fibers sewn on an embossed surface of a vinyl type plastic sheet of approximately .006 inch in thickness with a single straight line of lock stitches of #00 size cotton thread and of at least about 40 stitches to the inch, said embossed surface being regularly rugulose and having the individual rugulose unconformities with respect to the main plane of said vinyl sheet and with respect to the adjacent unconformities of the same order of magnitude as the cross-sectional dimensions of said loose staple fibers anchored thereto which surface characteristics render said individual loose staple fibers incapable of motion in any direction relative to one another at the point of attachment to the vinyl sheet, said vinyl sheet being sufficiently flexible so that it can be bent and folded back on itself during subsequent combing operations and being sufficiently tough to endure said stitching without exhibiting any tendency to tear along the line of stitches.

References Cited in the file of this patent

UNITED STATES PATENTS

| 2,013,148 | Gottlieb | Sept. 3, 1935 |
| 2,334,202 | Kanzow | Nov. 16, 1943 |

FOREIGN PATENTS

| 236,272 | Great Britain | July 1, 1925 |
| 567,527 | Great Britain | Feb. 19, 1945 |